US007421876B2

(12) United States Patent
Littooij et al.

(10) Patent No.: US 7,421,876 B2
(45) Date of Patent: Sep. 9, 2008

(54) MARKING MACHINE FOR METALLURGICAL PRODUCTS

(75) Inventors: Nico Littooij, Hinwil (CH); Daniel Groetzinger, Winterthur (CH)

(73) Assignee: Concast AG, Zurich (CH)

( * ) Notice: Subject to any disclaimer, the term of this patent is extended or adjusted under 35 U.S.C. 154(b) by 268 days.

(21) Appl. No.: 10/505,704

(22) PCT Filed: Feb. 25, 2003

(86) PCT No.: PCT/EP03/01884

§ 371 (c)(1),
(2), (4) Date: Nov. 18, 2004

(87) PCT Pub. No.: WO03/074295

PCT Pub. Date: Sep. 12, 2003

(65) Prior Publication Data

US 2005/0061053 A1 Mar. 24, 2005

(30) Foreign Application Priority Data

Mar. 5, 2002 (CH) .................................... 0384/02

(51) Int. Cl.
*B21J 13/03* (2006.01)
*C03B 33/027* (2006.01)

(52) U.S. Cl. ............................ 72/437; 72/418; 72/442; 72/203

(58) Field of Classification Search ................... 72/418, 72/437, 442; 173/202, 203, 205
See application file for complete search history.

(56) References Cited

U.S. PATENT DOCUMENTS

| | | | | | |
|---|---|---|---|---|---|
| 580,580 | A * | 4/1897 | Lovell | | 72/437 |
| 1,284,100 | A * | 11/1918 | Hart | | 72/437 |
| 1,491,285 | A * | 4/1924 | Blake et al. | | 173/202 |
| 1,518,549 | A * | 12/1924 | Prescott | | 173/203 |
| 1,743,840 | A | 1/1930 | Witte | | |
| 1,747,842 | A * | 2/1930 | Phillips | | 72/437 |
| 2,455,270 | A | 11/1948 | Auda | | |
| 2,475,398 | A * | 7/1949 | Montoya | | 72/437 |
| 4,129,188 | A | 12/1978 | El-Souessi et al. | | |
| 5,119,666 | A * | 6/1992 | Fujiwara | | 72/442 |
| 7,168,364 | B2 * | 1/2007 | Schneider | | 72/418 |

* cited by examiner

*Primary Examiner*—David B Jones
(74) *Attorney, Agent, or Firm*—Darby & Darby P.C.

(57) ABSTRACT

The invention relates to a marking machine for metallurgical products, more particularly continuous cast products, comprising at least one marking stamp and a striking device for striking the marking stamp into the product to be marked. The striking device is provided with a striking bolt and a striker spring driving said bolt. The striking bolt strikes the marking stamp that is placed in striking position by actuating the striker spring with an actuation element that is driven by an electric motor, thereby hammering the marking stamp into the product to be marked. Every time the marking stamp is subjected to the action of the spring, the stamp receives an evenly high kinetic energy thereby causing an evenly high striking depth of the marking. The spring in association with the electric motor drive enables fast, precise and easily controllable execution of the individual working steps of the machine. The ensures a high marking repetition rate.

16 Claims, 2 Drawing Sheets

MARKING MACHINE FOR METALLURGICAL PRODUCTS

CROSS-REFERENCE TO PRIOR APPLICATION

This is a U.S. national phase application under 35 U.S.C. §371 of International Patent Application No. PCT/EP03/01884 filed Feb. 25, 2003, and claims the benefit of Swiss Patent Application No. 0384/02 filed Mar. 5, 2002 which is incorporated by reference herein. The International Application was published in German on Sep. 12, 2003 as WO 03/074295 A1 under PCT Article 21(2).

BACKGROUND OF THE INVENTION

1. Field of the Invention.

The invention relates to a marking machine for metallurgical products, in particular continuous cast products, comprising at least one marking die and a striking device for striking the marking die into the product to be marked.

2. Description of the Related Art

As is known, machines of this type are used to provide metallurgical products, in particular continuous cast products such as billets, slabs inter alia, with a marking, which is composed of one or more joined up marks. To carry out the marking the die provided with the mark is brought into the striking position and then driven into the product to be marked with the aid of the striking device. The aim in the process is a striking depth that is as high and uniform as possible and a marking repetition rate which is as fast as possible. This also applies, in particular, to markings with a plurality of dies used one after the other.

In the known marking machines of the type mentioned at the outset the striking device is equipped with a hydraulic drive (EP 0094369 A2). Both the overall construction and the overall control are expensive owing to the cylinders, valves, connecting lines and other equipment required for this. Their relatively slow and imprecise mode of operation is also a drawback.

SUMMARY OF THE INVENTION

The object of the invention is to avoid these drawbacks and to provide a marking machine of the type mentioned at the outset, of which the striking device is distinguished by a simple and easy-to-maintain construction and a fast, precise and reliable mode of operation.

This object is achieved according to the invention in that the striking device is provided with a striking pin striking the marking die, a striking spring driving the striking pin and an actuating element with an electromotive drive acting on the striking spring.

The spring loading according to the invention of the marking die imparts uniformly high kinetic energy thereto and thus causes a high and uniform striking depth of the marking. In conjunction with the electromotive drive it allows a fast, precise and easily controllable sequence of the individual operating steps of the machine and reliably contributes toward the fact that it can operate without malfunctioning even in rough operation.

According to the invention, the actuating element can be driven by an electric motor via which the striking spring can be tensioned, then can be held in the tensioned state and subsequently relieved of tension in a controlled manner.

The striking spring on the striking pin is expediently arranged between a fixed supporting bearing and a support collar of the striking pin and can be actuated by a cam element pressing against the support collar in the tensioning direction of the striking spring.

To increase the striking frequency of the striking device, the cam element comprises, according to the invention, a cam carrier which can be rotated by the electric motor and is provided with two diametrically arranged cams. Consequently it is possible, by rotating the cam carrier, to tension the striking spring with the one cam and to then abruptly relieve it of tension.

It is advantageous in the context of robust and-precise axial guidance of the striking pin when the striking device comprises a mounting structure with guide bearings for the striking pin and the support collar thereof slides along a guide element arranged in the mounting structure.

One of the guide bearings is expediently provided as a fixed supporting bearing of the striking spring.

BRIEF DESCRIPTION OF THE DRAWINGS

The invention will be described in more detail hereinafter with the aid of an embodiment and with reference to the drawings, in which.

DESCRIPTION OF EMBODIMENTS OF THE INVENTION

Figure 1:
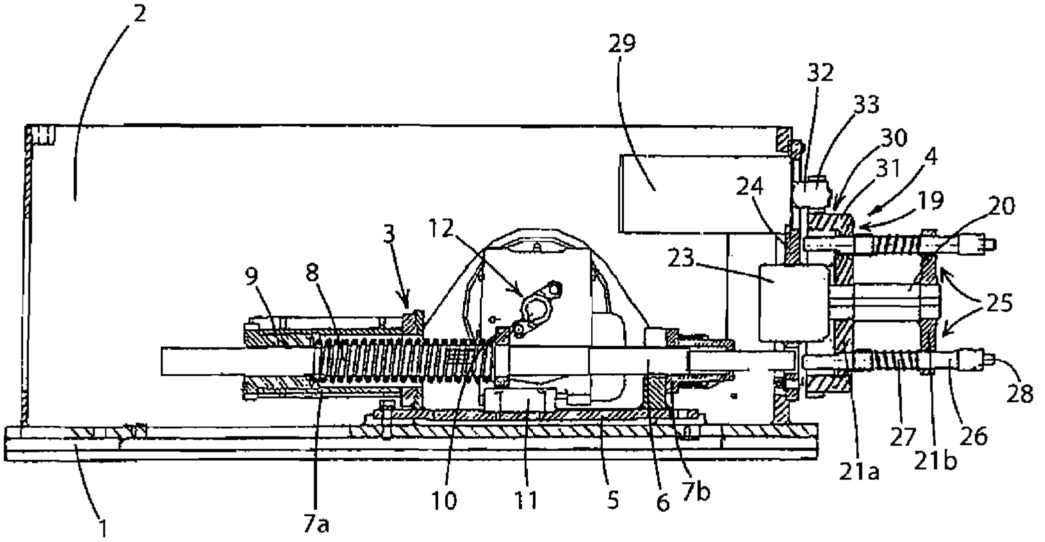
FIG. 1 shows the striking device of the marking machine according to the invention with a plurality of dies arranged in a revolver head.
Figure 2:
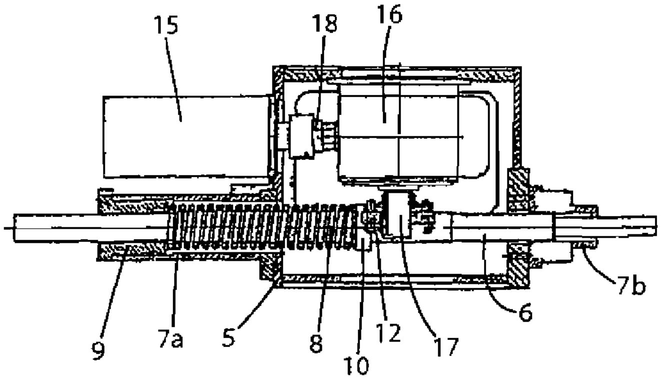
FIG. 2 shows a section along the line II-II in FIG. 1.

The marking machine illustrated in FIGS. 1 to 4 comprises a machine frame 1 with a carrier housing 2 fastened thereto and in which a striking device 3 and a die carrier 4 are fitted.

As can be seen from FIGS. 1 to 4, the striking device 3 comprises a mounting structure 5 with a striking pin 6 which is axially guided in two guide sleeves 7*a*, 7*b* and can be loaded by a striking spring 8 located thereon. The striking spring is fitted between a fixed supporting bearing 9 and a support collar 10 provided in the striking pin 6. The supporting bearing 9 is screwed into the guide sleeve 7*a*. A guide element 11 for the support collar 10 of the striking pin 6 is arranged in the mounting structure 5.

The striking spring 8 can be actuated by an actuating element in the form of a cam element 12 which is formed by a cam carrier 13 with two diametrically arranged cams 14*a*, 14*b*.

The cam element 12 can be driven by an electric motor 15 via a worm gear 16, by means of which the cam carrier 13 located at its driven shaft 17 can be rotated. A coupling 18 is arranged between the cam carrier and the servomotor 15.

As can be seen from FIG. 1, the die carrier 4 has a revolver head 19 with an rotational axle 20 and two guide discs 21*a*, 21*b*. The rotational axle 20 is mounted in a housing 23 fastened to a carrying plate 24. The revolver head 19 carries annularly arranged marking dies 25 with die pins 26 which each comprise a restoring spring 27 and an end face mark 28 and are guided in the guide discs 21*a*, 21*b* of the revolver head 19 axially parallel with the rotational axle 20 thereof.

The revolver head 19 can be driven by an electric servomotor 29 via a toothed gearing 30 comprising a toothed ring 31 fastened to the revolver head 19 and a pinion 33 located on the drive shaft 32 of the servomotor 29.

Figure 3:
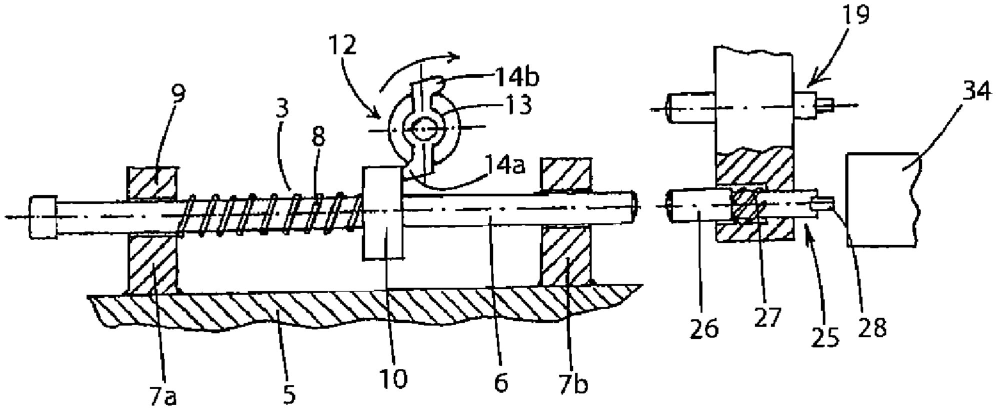
FIG. 3 shows, schematically and somewhat enlarged, the striking device of FIG. 1 in the tensioned position.
Figure 4:
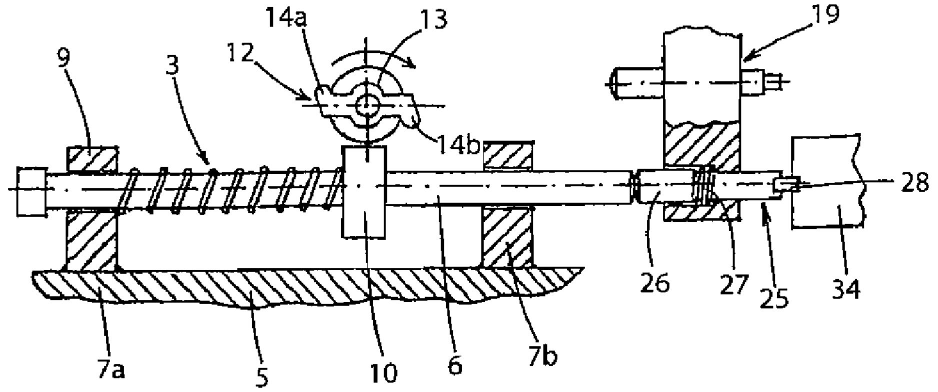
FIG. 4 shows, again schematically and somewhat enlarged, the striking device of FIG. 1 in the relaxed position.

The mode of operation of the above-described marking machine is as follows:

The striking device 3 and the revolver had 19 with the marking dies 25 are initially located in the operating position shown in FIG. 3 in which the marking die 25 to be actuated assumes the desired striking position with respect to the product 34 to be marked. The striking pin 6 is coaxially oriented with the marking die 25. The cam 14*a* pressing on the support collar 10, with the aid of the servomotor 15, holds the striking pin 6 in the illustrated starting position in which the striking spring 8 is tensioned and the striking pin 6 is slightly distanced from the marking die 25.

To trigger the marking operation, the cam element 12 is rotated by the servomotor 15 such that the cam 14*a* is pivoted out of the support collar 10. As a result, the striking spring 8 is abruptly relieved of tension and drives the striking pin 6 in the direction of the product to be marked. The striking pin 6 strikes the marking die 25 and in the process imparts high kinetic energy thereto which means that the die can strike into the product to be marked with correspondingly high striking force. This ensures that the stipulated standard depth is attained.

To repeat the marking, the cam element 12 is accordingly rotated further by the servomotor 15 until the cam 14*b* presses on the support collar 10 and the striking pin 6 with the striking spring 8 returns into the position shown in FIG. 3. The operation is then continued as described above.

To change the marking, the revolver head 19 is rotated in advance until the marking die with the desired mark has attained the striking position shown in FIG. 3. The marking operation is then carried out as described above. Accordingly a plurality of marks is used in marking processes.

Programming of the overall controller is facilitated by the electromotive drive. The striking force of the striking spring 8 can be finely adjusted by screwing in or unscrewing the supporting bearing 9 in the guide sleeve 7*a*.

The described marking machine is equipped with the rotatable revolver head 19 as the die carrier, so that the individual marking dies 25 can be brought into the desired striking position by rotating the die carrier. However, it is also easily possible within the scope of the invention to provide, for example, a displacement device as the die carrier, so that in this case the individual dies can be brought into the striking position by displacement of the die carrier.

Obviously it is also possible within the scope of the invention to provide a die carrier with just one marking die.

Any electrically driven motor which can hold the striking spring 8 in the tensioned state can be used as the drive motor for the striking device according to the invention, possibly in conjunction, for example, with a suitable retention mechanism, possibly because it can exert a corresponding moment in the resting state.

The invention claimed is:

1. Marking machine for marking products comprising at least one marking die and a striking device for striking the marking die into a product to be marked, the striking device having a striking pin for striking the marking die, a striking spring for driving the striking pin, an actuator to actuate the striking spring, and a die carrier that carries the at least one marking die comprising a marking die pin with an end face mark and adapted to bring the marking die pin from a first position where it is not coaxial with the striking pin to a second position where it is coaxial with the striking pin prior to striking a product.

2. Marking machine according to claim 1 wherein the actuator is driven by an electric motor whereby the striking spring is energized and subsequently relieved of energy in a controlled manner.

3. Marking machine of claim 2, wherein the actuator compresses the spring.

4. Marking machine of claim 1, further comprising a displacement device for the die carrier, the die carrier having at least two marking dies and adapted to orient each of the at least two marking dies coaxially with the striking pin.

5. Marking machine of claim 4, wherein the displacement device comprises a revolving head.

6. Marking machine of claim 1 for marking metallurgical products.

7. Marking machine of claim 6 for marking continuously cast products.

8. Marking machine comprising at least one marking die and a striking device for striking the marking die into a product to be marked, the striking device having a striking pin for striking the marking die, a striking spring for driving the striking pin and an actuator to actuate the striking spring, wherein the striking spring is located between a fixed supporting bearing and a support collar on the striking pin and the actuator has a earn element that actuates the striking spring by pressing against the support collar.

9. Marking machine according to claim 8, wherein the cam element comprises a rotatable cam carrier having at least two diametrically opposed cams.

10. Marking machine according to claim 8 wherein the cam element is driven by a worm gear.

11. Marking machine according to claim 8 wherein the striking device further comprises a mounting structure with guide bearings for the striking pin and the support collar slides along a guide element located in the mounting structure.

12. Marking machine according to claim 11, wherein one of the guide bearings comprises the fixed supporting bearing.

13. Marking machine of claim 8, wherein the supporting bearing is movable and a striking force of the striking spring may be adjusted by moving the supporting bearing.

14. Marking machine of claim 8, wherein the cam element compresses the spring by pressing against the support collar.

15. Marking machine comprising at least one marking die and a striking device for striking the marking die into a product to be marked, the striking device having a striking pin for striking the marking die, a striking spring for driving the striking pin and an actuator to actuate the striking spring, further comprising a displacement device having at least two marking dies and adapted to orient each of the at least two marking dies with the striking pin.

16. Marking machine of claim 15, wherein the displacement device comprises a revolving head.

* * * * *